United States Patent [19]

Iseler et al.

[11] Patent Number: 4,855,097
[45] Date of Patent: Aug. 8, 1989

[54] COMPRESSION MOLDING A CHARGE USING VACUUM

[75] Inventors: Kenneth A. Iseler, Richmond; Robert E. Wilkinson, Birmingham, both of Mich.

[73] Assignee: The Budd Company, Troy, Mich.

[21] Appl. No.: 885,583

[22] Filed: Jul. 14, 1986

Related U.S. Application Data

[63] Continuation of Ser. No. 640,470, Aug. 13, 1984, Pat. No. 4,612,149.

[51] Int. Cl.[4] .............................................. B29C 43/56
[52] U.S. Cl. .................................... 264/102; 264/129; 264/257; 264/258
[58] Field of Search ............... 264/101, 102, 255, 247, 264/263, 325, 257, 258, 129; 425/405 R

[56] References Cited

U.S. PATENT DOCUMENTS

| | | | |
|---|---|---|---|
| 3,840,239 | 10/1974 | Fazekas et al. | 277/235 R |
| 3,957,943 | 5/1976 | Ogura . | |
| 3,997,286 | 12/1976 | Gabrys . | |
| 4,076,780 | 2/1978 | Ditto | 264/325 X |
| 4,076,788 | 2/1978 | Ditto | 264/255 |
| 4,081,578 | 3/1978 | Van Essen et al. | 264/247 X |
| 4,204,822 | 5/1980 | Hewitt . | |
| 4,267,142 | 5/1981 | Lankbeet . | |
| 4,367,192 | 1/1983 | Arnason | 264/255 |
| 4,438,062 | 3/1984 | Griffith et al. | 264/255 |
| 4,488,862 | 12/1984 | Epel et al. | 425/405 R |

FOREIGN PATENT DOCUMENTS 0033638 8/1981 European Pat. Off. .

OTHER PUBLICATIONS

J. D. Gorsuch et al, "Surface Porosity and Smoothness of SMC Molding as Affected by Vacuum and Other Molding Variables", 33rd Annual Technical Conference, 1978, Reinforced Plastics/Composites Institute) The Society of the Plastics Industry, Inc., Section 9-F, pp. 1-7.
Isham, "Preventing Porosity in SMC Panels", SPE/-PIAD-Detroit Section Regional Technical Conference, Detroit, MI, Apr. 1, 1985.
"Porosity in SMC-Studies Show it can be Licked!", Technical News Bureau, Inc., undated, 11 pages.
Owens-Corning Fiberglass Memo Report, "Evaluation of the Effect of Some SMC Sheet Manufacturing and Molding Variables on Porosity", Jan. 16, 1984, 17 pages.
Owens-Corning Fiberglas Memo Report, "Reduction of Porosity in SMC Panels", Apr. 10, 1984, 12 pages.
Owens-Corning Fiberglass Memo Report, "Status Report-Porosity Elimination", Apr. 13, 1984.
Keegan, "Proper Mold Venting is One Answer to Costly Parts Rejection", Plastics Engineering Magazine, Aug. 1978.
Jutte, "Structural SMC: Material, Process and Performance Review", SPI Annual Technical Conference, 1978.
Denton, "Mechanical Properties Characterization of an SMC-R50 Composite", SPI Annual Technical Conference, 1979.
Monk, Thermosetting Plastics, Chpts. 2,3, 6 & 8, published by George Godwin Limited, 1981.
Ownes-Corning Fiberglas Corporation Technical Paper entitled, "Reducing SMC Porosity-Studies Show It Can be Done", pp. 1-6.

Primary Examiner—James Lowe
Assistant Examiner—Jeremiah F. Durkin, II
Attorney, Agent, or Firm—Harness, Dickey & Pierce

[57] ABSTRACT

A method for making a part with a smooth surface, such as an exterior automotive body panel, by compression molding a charge containing a curable resin. The charge is placed on the molding surface of one of the dies of a compression mold so that the charge covers 40%-80% of the surface area of the molding surface. The molds are moved to a partially closed position and the mold cavity is quickly evacuated. The mold is then closed so that the dies compress the charge to cause it to fill the mold cavity and, after the resin cures, the part is removed from the mold.

18 Claims, 2 Drawing Sheets

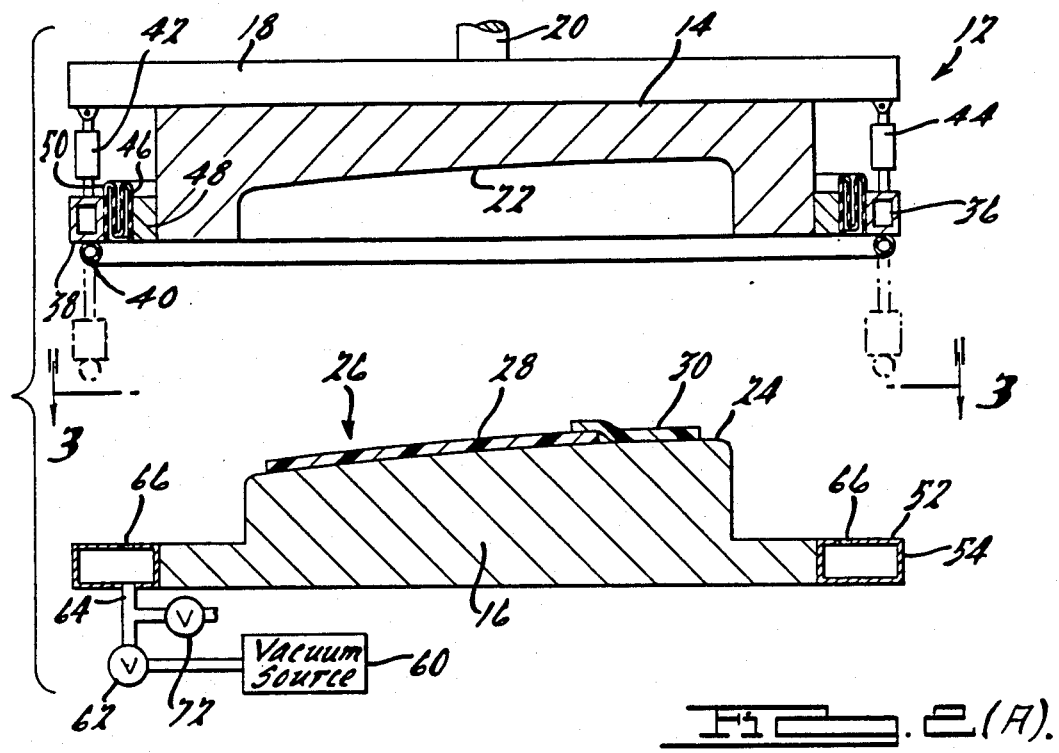
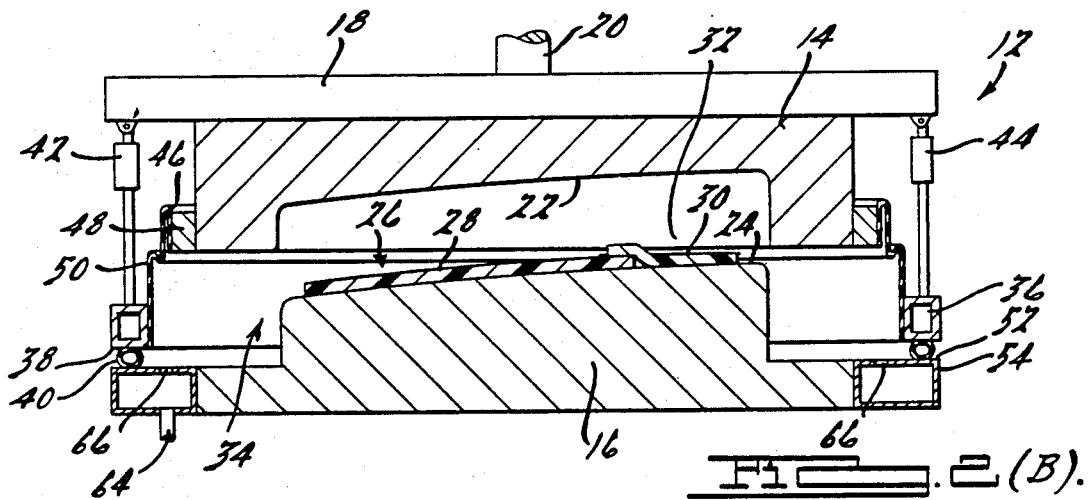
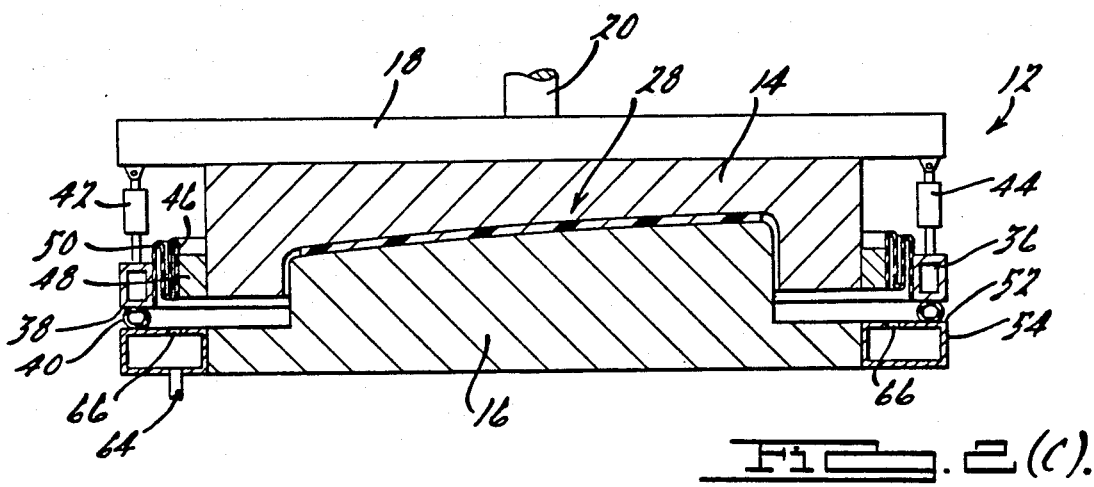

COMPRESSION MOLDING A CHARGE USING VACUUM

This is a continuation of U.S. patent application Ser. No. 640,470, filed Aug. 13, 1984 entitled "Compression Molding a Charge Using Vacuum", now U.S. Pat. No. 4,612,149.

TECHNICAL FIELD

This invention relates to compression molding and, more particularly, to techniques for compression molding a charge using vacuum.

BACKGROUND ART

By way of background, compression molding is a technique for forming parts wherein a charge is placed between upper and lower heated die members defining a mold cavity. The dies are then brought to a closed position where the dies compress the charge causing it to flow and fill the mold cavity. After the resin cures, the molds are opened and the finished part removed.

Compression molding techniques have been used to make parts having a relatively flat surface, such as exterior automotive body panels. The charges used for making such parts generally consist of a thermosetting resin containing reinforcing fibers and various fillers. Quite often, the charges are formed into sheets known in the art as sheet molding compound (SMC). Unfortunately, it has been extremely difficult to mold glass fiber reinforced plastic (FRP) parts so that they have an extremely smooth surface. Quite often, the molded parts have surfaces that are blistered, rough or porous. It is commonly believed that such defective areas result primarily from air that is trapped in the charge during molding. In an effort to minimize trapped air it is conventional practice to use a relatively thick charge which covers a relatively small area of the molding surface so that the air in the charge is "squeezed" out when the dies are closed.

It has been recognized that the use of vacuum during the compression molding process may be useful in reducing the number of defects in the surface of the part. (See, e.g. U.S. Pat. No. 3,840,239 to Fazekas et al and U.S. Pat. No. 4,488,862, filed Apr. 25, 1983 to Epel et al which is assigned to the assignee of the present invention.) However, the results were not always completely satisfactory. (See Gorsuch et al, "Surface Porosity and Smoothness of SMC Molding as Affected by Vacuum and Other Molding Variables", 33rd Annual Technical Conference, 1978, Reinforced Plastics/Composites Institute, the Society of the Plastics Industry, Inc., Section 9-F, pages 1–7).

In more recent years the industry has used what is known as an "in-mold coating" technique to provide parts with a commercially acceptable smooth finish. This "in-mold coating" technique is disclosed, for example, in U.S. Pat. No. 4,081,578 to van Essen et al. Briefly, this method employs an additional processing step where the cured part remains in the mold and is coated with a composition that spreads and penetrates the surface to fill the pores and voids therein.

Unfortunately, this technique has several drawbacks. For example, the additional coating operation consumes valuable machine time and lessens the amount of production which can be gained from a single mold. Relatively sophisticated and expensive mechanisms must be utilized to control the application of the coating to the part surface, and care must be taken to insure that the coating will properly bond to the surface of the part. Those skilled in the art are probably aware of still other problems that are associated with the use of the "in-mold coating" process. However, despite these problems, it is generally accepted in the industry that the "in-mold coating" process is required in order to provide commercially acceptable parts, at least for exterior automotive body panels.

SUMMARY OF THE INVENTION

Pursuant to the present invention, parts can be compression molded with extremely smooth surface finishes without requiring the additional "in-mold coating" post-processing step. The method of this invention digresses from the past trend of the industry and, instead, again relies upon the use of vacuum during the compression molding process. It has been discovered that by placing the charge on the molding surface of one of the dies so that the charge covers a preselected percentage of the surface area of the mold that an unexpected decrease in surface roughness and waviness of the finished part can be achieved. Preferably, the charge coverage is 40%–80% of the surface area of the molding surface of the lower die which cooperates with the molding surface of the upper die to form the mold cavity.

In the preferred embodiment, a mold having an upper die and lower die with opposing molding surfaces cooperating to define a mold cavity is opened to allow the charge to be placed on the lower die. The charge consists of one or more plies of SMC material arranged so that it covers 40%–80% of the surface area of the molding surface on the lower die. The dies are moved toward each other to a partially closed position where the mold cavity is essentially defined but the other die remains spaced from the charge. The mold cavity is evacuated, preferably to a vacuum of at least 10 inches of mercury absolute within a period of less than 10 seconds. After the mold cavity is evacuated, the dies move together to compress the charge to cause it to flow and fill the mold cavity. The resin is allowed to cure under heat and pressure and, once cured, the mold is opened and the part removed.

It is not completely understood why the coverage of the charge is so critical in eliminating surface defects. One possible explanation is that if the charge coverage is less than about 40% the glass fibers tend to tumble when the necessarily thicker charge flows under compression of the mold dies. As a result, the fibers end up with an uneven orientation or glass concentration which shows up as surface waviness. Black blotches at the periphery of the part are sometimes also noticeable when the charge coverage is too low. At the higher end, charge coverages in excess of about 80% do not permit sufficient flow of the charge necessary to provide the slight movement required to smooth out the glass bundles resulting in areas that will "show through" when the part is painted with conventional paint systems. In addition, the use of vacuum during the molding operation tends to even further reduce the occurrence of blisters and porosity caused by trapped air.

In any event, by using the method of this invention one can produce parts with extremely smooth surface finishes without requiring the time-consuming and often difficult to control "in-mold coating" post-processing operation.

BRIEF DESCRIPTION OF THE DRAWINGS

Various other advantages will become apparent to one skilled in the art after reading the following specification and by reference to the drawings in which:

FIG. 2 (A-C) are cross-sectional views of the mold during various stages in the molding process.

DESCRIPTION OF THE PREFERRED EMBODIMENT

Figure 1:
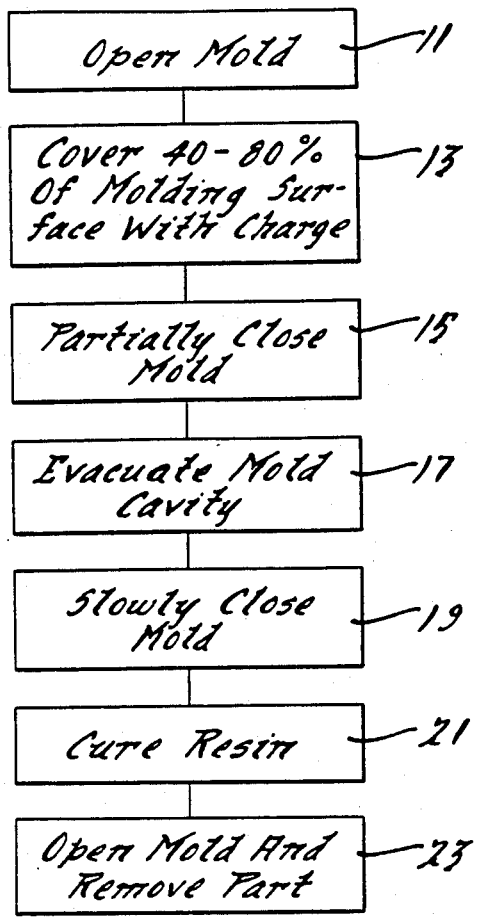
FIG. 1 is a flow chart illustrating the preferred steps in carrying out the method of the present invention.

As represented in Step 11 of FIG. 1 and referring to FIG. 2(A), the first general step is to open the compression mold generally designated by the numeral 12. Mold 12 has an upper die 14 and a lower die 16. Lower die 16 is mounted on a fixed bed (not shown) whereas upper die 14 is connected to a movable platen 18 operating under the action of a ram 20 or the like to control relative movement between the two dies. The manner of controlling the die movement is well within the skill of the ordinary practitioner and need not be described in detail herein.

Figure 3:
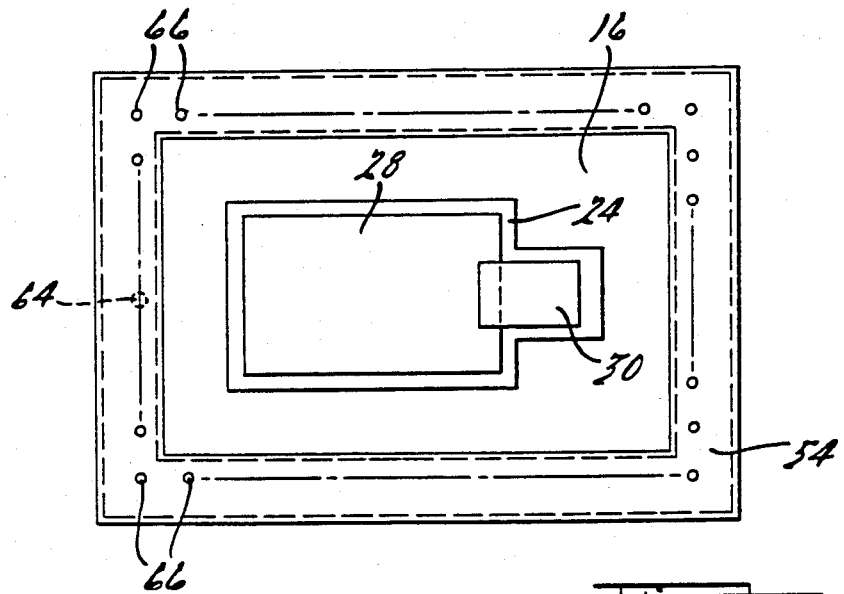
FIG. 3 is a plan view as viewed along the lines 3—3 of FIG. 2(A) illustrating the charge coverage on the molding surface of the lower die.

The upper die 14 has a female molding surface 22 whereas the lower die 16 has a male molding surface 24. Molding surfaces 22 and 24 cooperate to define a mold cavity having a shape corresponding to the desired shape of the part to be made. The shape of the molding surface will, of course, vary depending upon the configuration of the final part. However, the present invention is particularly well suited for forming parts having relatively large and generally flat surfaces having surface areas larger than 2 square feet. Nonlimiting examples of such types of parts include exterior automotive body panels such as hoods, deck lids, roofs and the like. FIG. 3 schematically illustrates the outline of the molding surface 24 for a lower die 16 designed to mold an automotive body panel of these types. For purposes of this invention, a molding surface is a surface on one die member which cooperates with an opposing surface on another die member to form a mold cavity.

In the open position, dies 14 and 16 are spaced apart a sufficient distance to allow a charge 26 to be placed on the molding surface 24 of the lower die 16 as represented by step 13 of FIG. 1. For purposes of this invention, the term "charge" means a material containing a resin that cures to a rigid, solid state. The resin that may be used may be any material that provides the necessary bonding and strength for the composite article to be formed. Among typical resins are polyesters, vinyl esters, novalacs and epoxies. Preferred resin materials are thermally cured polyester resins. The present invention finds particular utility for compression molding charges in the form of one or more sheets of sheet molding compound (SMC) material. SMC material includes a thermosetting resin mixed with reinforcing fibers and various fillers to form a semi-solid sheet or ply that can be cut into desired shapes and placed into the mold. Typical fibers include polyimide fibers, polyester fibers, polyamide fibers, natural fibers and metal fibers. Preferably, the fibers are glass fiber strands and carbon strands. Glass fibers are presently the most preferred. Non-limiting examples of commercially available SMC material include "Class A 2000" SMC from The Budd Company, "Permiglas" SMC from Premix, Inc.; and "Smooth Surface" SMC from Owens Corning Fiberglas.

While this invention is particularly suited for use with thermosetting SMC material, it is envisioned that good results should be obtainable from other types of charges such as bulk molding compound, thick molding compound and XMC material, a trademark of PPG Industries for continuous fiber SMC.

In FIGS. 2(A) and 3, charge 26 takes the form of two sheets 28 and 30 of SMC material. Pursuant to the present invention, sheets 28 and 30 are laid on molding surface 24 so that the charge covers 40%–80% of the total surface of molding surface 24. As was discussed, charge coverage less than 40% or greater than 80% causes an unacceptable increase in the surface waviness and imperfections of the finished part. For most exterior automotive body panels the preferred range is 50%–75% charge coverage. As is within the knowledge of the ordinary practitioner, the thickness, weight, and placement of the charge on the molding surface will vary depending upon the configuration of the final part. In general, the charge should be generally centrally located with little or no space being left between individual sheets if more than one is used, as represented by the slight overlap between sheets 28 and 30. Each of the illustrated sheets 28 and 30 of charge 26 preferably consist of 1-4 plies of SMC material stacked on one another, each ply being about $\frac{1}{8}$-$\frac{1}{4}$ inch thick. This is in contrast to some typical procedures where 6-10 plies make up a much thicker charge covering only about 25% of the surface area.

As indicated in step 15, the next general step is to move the molds to a partially closed position as shown in FIG. 2(B). In the partially closed position, the mold cavity 32 is essentially defined by the dies but the upper die 14 remains spaced from charge 26. In addition, a sealed vacuum chamber 34 surrounding mold cavity 32 is created when the upper seal hose 40 contacts the lower seal ring 52. The spacing between the dies in the partially closed position should be kept as small as possible so as to minimize the volume that needs to be evacuated. A spacing of several inches is generally satisfactory.

The preferred molding apparatus includes an annular ring 36 surrounding upper die 14. Ring 36 takes the form of rectangular metal tubing in this embodiment operative to present a generally horizontal flat surface 38 on lower portions thereof. The flexible seal hose 40 is mounted to the surface 38. Ring 36 is free to move relative to upper die 14 under the action of a plurality of pneumatically or hydraulically actuated cylinders. Two cylinders 42 and 44 are shown in the drawings. Normally, when the mold is open the cylinders are extended as shown in the phantom lines in FIG. 2(A). A flexible diaphragm or bellows 46 has its inner edge rigidly connected to the periphery of die 14 via flange member 48, while the outer edge of bellows 46 is connected to flange 50 extending from ring 36.

To arrive at the position shown in FIG. 2(B), the ram 20 is actuated to move the upper die 14 to the partially closed position where the hose seal 40 contacts ring 52. Thus, the vacuum chamber 34 is defined by upper die 14, bellows 46, sealing ring 36, hose 40 serving as a compression seal, member 54 and lower die 16. The downward force provided by cylinders 42, 44 serves to insure that a consistently reliable seal is provided around the mold cavity 32. In addition, the cylinders can be used to move ring 36 upwardly (as shown in FIG. 2(A)) relative to the upper die 14 to permit easy access to the die for purposes of cleaning and installation, as well as for other reasons that easy access is advantageous.

Once the chamber 34 has been sealed, the next step is to evacuate the mold cavity as represented by step 17 of FIG. 1. Satisfactory results are obtainable by drawing a vacuum within mold cavity 32 to at least 10 inches of mercury absolute within a period of less than 10 seconds. Preferably, however, a vacuum of 5 inches of mercury is drawn within 5 seconds after the dies have reached their partially closed position. This can be accomplished by way of a vacuum source 60 which is connected via valve 62 to the vacuum chamber 34. Preferably, vacuum source 60 consists of a plurality of previously evacuated tanks (not shown) that are sequentially connected to the vacuum chamber 34. A relatively large pipe 64 is connected to the hollow tubing 54 which includes a plurality of openings 66 on inboard regions of its surface 52. Thus, fluid communication is established between the vacuum tanks and the chamber 34. The dual use of the hollow tubing 54 as part of the vacuum sealing arrangement (via surface 52) and as a relatively large conduit for pulling the vacuum is a particularly advantageous construction.

Once the mold cavity has been evacuated, the upper die begins to move towards the fully closed position of the dies. During the mold closing step, the upper die contacts the charge 26 causing it to spread and fill the mold cavity 34. It should be understood that it is not necessary for the upper die to completely stop at the partially closed position during its downward travel as this may not be practical for larger presses. All that is necessary is that the vacuum chamber be sealed and evacuated before the die contacts the charge. Means (not shown) are provided for heating the upper and lower dies when the resin in charge 26 is of the thermosetting type. For typical SMC charges, the die should be heated to 140-160 degrees Centigrade, with the dies providing a molding pressure of 500-1500 psi.

Once the mold reaches the fully closed position as shown in FIG. 2(C), the mold cavity may be returned to atmospheric pressure. This can be accomplished by closing valve 62 and opening valve 72 which is connected to atmospheric pressure. When valve 62 is closed the vacuum tanks can be evacuated by a vacuum pump to begin preparation for the next molding cycle.

Once the resin cures, the molds are opened to permit removal of the part as represented in Step 23 of FIG. 1. Typically, for SMC charges the cure time is 1 to 3 minutes for each ⅛ inch of thickness of the molded part.

Parts made according to the present invention exhibit remarkable surface smoothness while minimizing pits and blisters to such an extent that the use of the "in-mold coating" step is generally not required to provide currently acceptable parts. Consequently, the additional expense and difficulties associated with the in-mold coating process can be avoided. Those skilled in the art will come to appreciate that other advantages and modifications of the particular examples set forth herein are obtainable without departing from the spirit of the invention as defined in the following claims.

We claim:

1. A method of making a part having a large surface area and providing the part with a smooth surface by compression molding a charge containing a curable resin, said method comprising:

(a) opening a mold having an upper die and a lower die with opposing molding surfaces that cooperate to define a mold cavity having a shape corresponding to the desired shape of the part;
   (b) placing the charge on the molding surface of one of the dies so that the charge covers 40%-80% of the surface area of the molding surface, the charge being in the form of at least one ply of thermosetting sheet molding compound (SMC) containing a heat curable resin and reinforcing fibers therein;
   (c) moving the dies toward each other to a partially closed condition where the mold cavity is essentially defined but the other die remains spaced from the charge;
   (d) evacuating the mold cavity;
   (e) closing the mold so that the dies compress the charge to cause it to fill the mold cavity;
   (f) allowing the resin to cure; and
   (g) opening the dies and removing the part.

2. The method of claim 1 wherein the mold cavity is evacuated in Step (d) to at least 10 inches of mercury absolute within a period of less than 10 seconds.

3. A method of making an automotive exterior body panel characterized by a large, generally flat surface which is desired to have a smooth finish, said method comprising:

(a) opening a mold having an upper die and lower die with opposing molding surfaces cooperating to define a mold cavity having a shape corresponding to the desired shape of the panel;
   (b) placing a charge of sheet molding compound (SMC) on the molding surface of one of the dies so that the charge covers 40%-80% of the surface area of the molding surface;
   (c) moving the dies toward each other to a partially closed condition where the mold cavity is essentially defined but the other die remains spaced from the charge;
   (d) evacuating the mold cavity to at least 10 inches of mercury absolute within a period of less than 10 seconds;
   (e) closing the mold so that the dies compress the charge causing it to fill the mold cavity;
   (f) heating the charge to 140-160 degrees Centigrade under a pressure between the dies of 500-1500 psi; and
   (g) opening the dies and removing the panel.

4. The method of claim 3 wherein the charge consists of not more than 4 plies of SMC material, each ply being about ⅛-¼ inch thick.

5. The method of claim 3 wherein the charge covers 50%-75% of the molding surface.

6. A method of making a fiber reinforced plastic part, said method comprising:

(a) opening a mold having an upper die and a lower die with opposing moldings surfaces that cooperate to define a mold cavity having a shape corresponding to the desired shape of the part;
   (b) arranging plies of sheet molding compound (SMC) material on the molding surface of the one of the dies so that the plies cover 40-80 percent of the surface area of the molding surface, the maximum thickness of the plies being 1 inch;
   (c) moving dies toward each to a partially closed position where the mold cavity is essentially defined but the other die remains spaced from the charge;

(d) evacuating the mold cavity to at least 5 inches of mercury absolute within a period of less than 5 seconds;
(e) continuing the movement of the dies toward each other so that the other die contacts the plies causing the SMC to flow and fill the mold cavity;
(f) allowing resin in the SMC to cure; and
(g) opening the dies and removing the part.

7. A method of compression molding a part so that it exhibits an extremely smooth surface finish that can be painted without substantial visualization of surface imperfections, said method comprising:
  (a) opening a mold having an upper die and a lower die with opposing molding surfaces that cooperate to define a mold cavity having a shape corresponding to the desired shape of the part;
  (b) placing a sheet molding compound charge on a molding surface of the lower die so that the charge covers 40-80 percent of the surface area of the molding surface of the lower die;
  (c) lowering the upper die towards the lower die to a partially closed position where the mold cavity is sealed but the upper die remains spaced from the charge;
  (d) evacuating the mold cavity before the upper die contacts the charge;
  (e) compressing the SMC charge with the upper die to cause the SMC charge to flow and fill the mold cavity;
  (f) opening the dies and removing the part; and
  (g) painting the part whereby the surface quality of the painted part is aesthetically pleasing.

8. The method of claim 7 wherein the part is an exterior automotive body panel.

9. The method of claim 8 wherein the part is painted without a previous in-mold coating being applied thereto.

10. The method of claim 7 wherein the mold cavity is evacuated to at least 10 inches of mercury absolute within a period of less than 10 seconds.

11. The method of claim 10 wherein the SMC charge covers 50-75 percent of the molding surface of the lower die.

12. A method of making an automotive exterior body panel capable of being painted without requiring a previous in-mold coating processing step, said method comprising:
  opening a compression mold having an upper die and a lower die with opposing molding surfaces that cooperate to define a mold cavity having a shape corresponding to the desired shape of the panel;
  heating the dies to a temperature of at least 140° C.;
  placing not more than 4 plies of a sheet molding compound (SMC) charge on the lower die so that the charge covers 50-75 percent of the molding surface of the lower die;
  lowering the upper die towards the lower die to a partially closed position where the mold cavity is essentially defined and sealed but the upper die remains spaced from the charge;
  evacuating the mold cavity to at least 5 inches of mercury absolute within a period of less than 5 seconds;
  lowering the upper die until it contacts the charge and compresses it at a pressure of 500-1500 psi to cause the charge to flow and fill the mold cavity;
  opening the dies and removing the part; and
  painting the panel without requiring an in-mold coating step.

13. A method of making a fiber reinforced part with a large surface so that the surface is extremely smooth while the part remains structurally strong, said method comprising:
  (a) opening a mold having an upper die and a lower die with opposing molding surfaces that cooperate to define a mold cavity having a shape corresponding to the desired shape of the part, said mold further including a sealing ring surrounding the upper die;
  (b) placing a charge on the molding surface of the one of dies so that the charges covers 40-80 percent of the surface area of the molding surface, the charge being in the form of at least one ply of thermosetting sheet molding compound (SMC) containing a heat curable resin and reinforcing fibers therein;
  (c) lowering the upper die and sealing ring toward the lower die to a partially closed position where the sealing ring provides a vacuum seal around the mold cavity while the upper die remains spaced from the charge;
  (d) evacuating the mold cavity;
  (e) lowering the upper die so that it compresses the charge causing the charge to flow and fill the mold cavity;
  (f) allowing the resin to cure; and
  (g) opening the dies and removing the part.

14. The method of claim 13 wherein the mold cavity is evacuated to at least 10 inches of mercury absolute within a period of less than 10 seconds measured from the time that the sealing ring provides the vacuum seal surrounding the mold cavity.

15. The method of claim 14 which further comprises painting the large surface of the part.

16. The method of claim 15 wherein painting of part occurs without a previous in-mold coating applied to the part surface.

17. The method of claim 15 wherein the part surface has a surface area exceeding two square feet.

18. The method of claim 17 wherein the part is an exterior automotive body panel.

* * * * *

UNITED STATES PATENT AND TRADEMARK OFFICE
CERTIFICATE OF CORRECTION

PATENT NO. : 4,855,097

DATED : August 8, 1989

INVENTOR(S) : Kenneth A. Iseler and Robert E. Wilkinson

It is certified that error appears in the above-identified patent and that said Letters Patent is hereby corrected as shown below:

Title page:

Under Related U.S. Application Data after "4,612,149" insert
--which is a continuation-in-part application of U.S. Patent Application Ser. No. 488,494, filed April 25, 1983 entitled "Compression Molding Apparatus Having Vacuum Chamber", now U.S. Pat. No. 4,488,862, issued December 18, 1984.--

Column 1, line 6, after "4,612,149" insert
--which is a continuation-in-part application of U.S. Patent Application Ser. No. 488,494, filed April 25, 1983 entitled "Compression Molding Apparatus Having Vacuum Chamber", now U.S. Pat. No. 4,488,862, issued December 18, 1984.--

UNITED STATES PATENT AND TRADEMARK OFFICE
CERTIFICATE OF CORRECTION

PATENT NO. : 4,855,097

DATED : August 8, 1989

INVENTOR(S) : Kenneth A. Iseler and Robert E. Wilkinson

It is certified that error appears in the above-identified patent and that said Letters Patent is hereby corrected as shown below:

On the title page insert:

*Notice: The term of this patent subsequent to September 16, 2003 has been disclaimed.

"Other Publications": insert --Transcribed text of video tape of OCF's Porosity Program, August 2, 1984; Memo from David L. Schweikert dated May 11, 1984.--

"Other Publications": line 4, "Institute)" should be --Institute;--.

Col. 1, line 45, delete "filed Apr. 25, 1983".

Col. 1, line 58, "van Essen" should be --Van Essen--.

Col. 6, line 57, "moldings" should be --molding--.

Col. 6, line 61, delete "the" (second occurrence).

Col. 6, line 65, after "each" insert --other--.

Col. 8, line 26, after "of" delete --the--.

Col. 8, line 27, before "dies" insert --the--.

UNITED STATES PATENT AND TRADEMARK OFFICE
CERTIFICATE OF CORRECTION

PATENT NO. : 4,855,017

DATED : August 8, 1989

INVENTOR(S) : Kenneth A. Iseler and Robert E. Wilkinson

It is certified that error appears in the above-identified patent and that said Letters Patent is hereby corrected as shown below:

Col. 8, line 27, "charges" should be --charge--.

Signed and Sealed this

Fifth Day of March, 1991

Attest:

HARRY F. MANBECK, JR.

*Attesting Officer*    *Commissioner of Patents and Trademarks*